(12) United States Patent
Matsuno

(10) Patent No.: US 6,810,983 B2
(45) Date of Patent: Nov. 2, 2004

(54) CONTROL APPARATUS AND METHOD FOR FOUR WHEEL DRIVE VEHICLE

(75) Inventor: Koji Matsuno, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/635,656

(22) Filed: Aug. 7, 2003

(65) Prior Publication Data

US 2004/0026148 A1 Feb. 12, 2004

(30) Foreign Application Priority Data

Aug. 7, 2002 (JP) .................................... P. 2002-230432

(51) Int. Cl.[7] .......................................... B60K 17/344
(52) U.S. Cl. ........................................ 180/249; 701/69
(58) Field of Search ............................... 180/233, 248, 180/249, 250; 701/69

(56) References Cited

U.S. PATENT DOCUMENTS

| 4,874,059 | A | * | 10/1989 | Kasegawa ................... 180/249 |
| 6,145,614 | A | * | 11/2000 | Kimura et al. .............. 180/248 |
| 2002/0055416 | A1 | | 5/2002 | Sakakiyama |
| 2004/0026154 | A1 | | 2/2004 | Matsuno ..................... 180/336 |

FOREIGN PATENT DOCUMENTS

| JP | 03-86628 A | * | 4/1991 |
| JP | 08-132914 | | 5/1996 |
| JP | 2001-71776 | | 3/2001 |

OTHER PUBLICATIONS

U.S. Application Serial No. 10/634,802; filed Aug. 6, 2003.

* cited by examiner

*Primary Examiner*—Kevin Hurley

(57) ABSTRACT

A control apparatus for four wheel drive vehicle having differential limiting unit has: turning state determining unit; actual left and right wheel differential speed calculating unit; target differential speed setting unit; differential limiting torque calculating unit for setting a differential limiting torque at 0 in the event that an inside wheel speed falls below an outside wheel speed by a preset threshold value in the turning condition, and calculating a differential limiting torque on the basis of the target left and right wheel differential speed and the actual left and right wheel differential speed in the event that an inside wheel speed exceeds an outside wheel speed by the preset threshold value in the turning condition; and front and rear wheel differential limiting torque setting unit for setting a front and rear wheel differential limiting torque on the basis of a differential limiting torque which is calculated.

24 Claims, 5 Drawing Sheets

CONTROL APPARATUS AND METHOD FOR FOUR WHEEL DRIVE VEHICLE

BACKGROUND OF THE INVENTION

1. Field of the Invention

The present invention relates to a control apparatus for a four wheel drive vehicle having a differential limiting mechanism on at least either one of a front wheel or a rear wheel side and in which a transfer clutch freely engageable and disengageable is provided between the front and rear wheel sides for changing driving wheels.

2. Related Art

In general, it is known that a tight corner braking phenomenon easily happens to be generated by a differential limiting torque in implementing a differential limiting control according to a difference in wheel speeds between left and right wheels unless a target differential speed between the left and right wheels is set in consideration of the difference in a trace of the respective wheels when steering.

On the other hand, for example, JP-A-2001-71776 discloses the differential limiting of a center differential according to the front and rear wheel differential.

In adopting the differential limiting control of the center differential like the aforementioned related art on a vehicle equipped with a mechanical differential limiting mechanism on either one of front or rear wheel side for the purpose of sporty running, a mechanical differential limiting control between the left and right wheels interferes with the differential limiting control of the center differential. Then an unnecessary control is implemented at the center differential, whereby there may occur a risk that the mechanical differential limiting mechanism does not sufficiently actuate or an unexpected braking phenomenon is generated.

Namely, in a condition where a slippage of the inside wheel while turning is restrained by the mechanical differential limiting control between the left and right wheels, where by the speeds of the turning inner and outside wheels become identical. An excessive driving torque of the inside wheel is shifted to the outside wheel, whereby there is generated a yaw moment at a front portion of the vehicle toward a turning direction, which is desirable for a sporty running. However, in this case, this condition is the regarded as the slippage of the inside wheel and the differential limiting control of the center differential, the torque distribution to the front and rear axles changes vehicle behaviors, this leading to the risk that the tight corner braking phenomenon is generated.

SUMMARY OF THE INVENTION

The present invention was made in view of the situations, and an object thereof is to provide a control apparatus for a four wheel drive vehicle having a differential limiting mechanism on at least either one of a front wheel side or a rear wheel side which can not only prevent unnecessary spins of a inside wheel while turning by the differential limiting mechanism between left and right wheels when a sporty running is being performed but also avoid a tight corner braking phenomenon which would occur when the vehicle is steered largely at a low speed.

With a view to attaining the object, according to a first aspect of the present invention, there is provided a control apparatus for a four wheel drive vehicle having differential limiting unit on at least either one of a front wheel or the rear wheel side, the control apparatus having the turning condition determining unit for determining the turning condition of a vehicle, a left and right inside wheel actual differential speed calculating unit for calculating an actual left and right wheel differential speed according to a turning state of the vehicle, a target differential speed setting unit for setting a target left and right wheel differential speed at the differential limiting unit, a differential limiting torque calculating unit for setting a differential limiting torque based on an information at the differential limiting unit at 0, an inside wheel speed falls below an outside wheel speed by a preset threshold value in the turning state and for calculating a differential limiting torque based on the information at the differential limiting unit based on the target left and right wheel differential speed and the actual left and right wheel differential speed when the inside wheel speed exceeds an outside wheel speed by the preset threshold value in the turning state, and a front and rear wheel differential limiting torque setting unit for setting a front and rear wheel differential limiting torque based on a differential limiting torque based on the information which is calculated at the differential limiting torque calculating unit.

In addition, according to a second aspect of the present invention, there is provided a control apparatus for the four wheel drive vehicle as set forth in the first aspect of the present invention, wherein the threshold value used at the differential limiting torque calculating unit to compare the inside wheel speed with the outside wheel speed at 0 of the turning state.

Furthermore, according to a third aspect of the present invention, there is provided the control apparatus for the four wheel drive vehicle as set forth in the first or second aspect of the present invention, wherein in the event that the turning state determining unit determines the turning state of the vehicle substantially as a straight running condition, the actual actual left and right wheel differential speed calculating unit regards an actual left and right wheel differential speed at the differential limiting unit as an absolute value of a left and right wheel differential speed. The differential limiting torque calculating unit calculates a differential limiting torque based on the information at the differential limiting unit and the absolute value of the left and right wheel differential speed.

In addition, according to a fourth aspect of the present invention, there is provided the control apparatus for the four wheel drive vehicle as set forth in any of the first to third aspects of the present invention, wherein the turning state determining unit determines a turning state of the vehicle from at least one of a lateral acceleration, a yaw rate or a steering angle.

Furthermore, according to a fifth aspect of the present invention, there is provided the control apparatus for the four wheel drive vehicle as set forth in the fourth aspect of the present invention, wherein the turning state determining unit determines that the vehicle is in substantially a straight running state when an absolute value of at least one of the lateral acceleration, the yaw rate or the steering angle is smaller than a predetermined value.

According to a sixth aspect of the present invention, there is provided the control method for the four wheel drive vehicle having the differential limiting unit on at least either one of the front wheel or the rear wheel side, the control method having steps of: determining the turning state of the vehicle; calculating the actual left and right wheel differential speed at the differential limiting unit according to the turning state of the vehicle; setting the target left and right wheel differential speed at the differential limiting unit; setting a differential limiting torque based on the information at 0 of the differential limiting unit, in the event that at the differential limiting unit, an inside wheel speed falls below that of the outside wheel speed by the preset threshold value in the turning state; calculating the differential limiting torque based on the information at the differential limiting unit based on the target left and right wheel differential speed and the actual left and right wheel differential speed, in the event that the inside wheel speed exceeds the outside wheel speed by the preset threshold value in the turning state; and setting the front and rear wheel differential limiting torque based on the differential limiting torque based on the information at the differential limiting unit which is calculated at the previous step.

According to a seventh aspect of the present invention, there is provided the control method as set forth in the sixth aspect, wherein the threshold value used to compare the inside wheel speed with the outside wheel speed in the turning state 0.

According to an eighth aspect of the present invention, there is provided the control method as set forth in the sixth or seventh aspect, wherein in the event that the turning state is determined the turning state of the vehicle substantially as a running straight condition, the actual left and right wheel differential speed calculating step regards the actual left and right wheel differential speed at the differential limiting unit as an absolute value of the left and right wheel differential speed, and the differential limiting torque calculating step calculates the differential limiting torque based on the information at the differential limiting unit based on the target left and right wheel differential speed and the absolute value of the left and right wheel differential speed.

According to a ninth aspect of the present invention, there is provided the control method as set forth in any one of the sixth to eighth aspects, wherein the turning state is determined from at least one of the lateral acceleration, the yaw rate or the steering angle.

According to a tenth aspect of the present invention, there is provided the control method as set forth in the ninth aspect, wherein the turning state is determined that the vehicle is in substantially the straight running condition when the absolute value of at least one of the lateral acceleration, the yaw rate or the steering angle is smaller than the predetermined value.

Namely, in the four wheel drive vehicle control apparatus according to the first or sixth aspect of the present invention, the turning condition of the vehicle is determined with the turning state determining unit, the actual left and right wheel differential speed at the differential limiting unit provided on at least either one of the front wheel side or the rear wheel side is calculated according to the turning condition of the vehicle with the actual left and right wheel differential speed calculating unit. The target left and right wheel differential speed at the differential limiting unit is set with the target differential speed setting unit. Then, the differential limiting torque that can be obtained on the basis of the information at the differential limiting unit is set at 0 with the differential limiting torque calculating unit in the event that at the differential limiting unit, an inside wheel speed falls below the outside wheel speed by the preset threshold value in the turning state, whereas the differential limiting torque that can be obtained on the basis of the information at the differential limiting unit is calculated on the basis of the target left and right wheel differential speed. The actual left and right wheel differential speed with the differential limiting torque calculating unit in the event that the inside wheel speed exceeds the outside wheel speed by the preset threshold value in the turning condition. The front and rear wheel differential limiting torque setting unit sets the front and rear wheel differential limiting torque on the basis of a differential limiting torque on the basis of the information at the differential limiting unit which is calculated with the differential limiting torque calculating unit.

Here, as is described in the second or seventh aspect of the present invention, the threshold value used at the differential limiting torque calculating unit to compare the inside wheel speed with the outside wheel speed in the turning condition is, to be specific (especially), 0 or the value which results when the inside wheel speed and the outside wheel speeds are identical (or equal) to each other.

In addition, as is described in the third or eighth aspect of the present invention, in the event that the turning state determining unit determines the turning condition of the vehicle substantially as the straight running condition, the actual left and right wheel differential speed calculating unit regards the actual left and right wheel differential speed at the differential limiting unit as an absolute value of a left and right wheel differential speed. The differential limiting torque calculating unit calculates a differential limiting torque on the basis of information at the differential limiting unit on the basis of the target left and right wheel differential speed and the absolute value of the left and right wheel differential speed.

As is described in the fourth or ninth aspect of the present invention, the turning state determining unit determines the turning condition of the vehicle from at least one of the lateral acceleration, the yaw rate and the steering angle. When the absolute value thereof is smaller than a predetermined value, as is described in the fifth or tenth aspect of the present invention, the vehicle is determined as being in substantially the straight running state.

By providing the control apparatus for the four wheel drive vehicle as described heretofore, for example, when the grip of the inside wheel reaches its limit and the inside wheel begins to spin during a sporty running (an accelerator pedal is depressed while the vehicle is turning), the driving torque is shifted to the outside wheel by the mechanical differential limiting control between the left and right wheels, and a yaw moment of the front portion of vehicle toward a turning direction is generated. As this occurs, in case the differential limiting torque between the left and right wheels is sufficient, since the inside wheel speed falls below that of the outside wheel by the predetermined threshold value, the differential limiting control of the center differential is not implemented. There is caused no risk that the differential limiting torque of the center differential interferes unnecessarily. On the other hand, in the case the differential limiting torque between the left and right wheels is insufficient, the inside wheels rotates much faster than that of the turning outside wheels, while the traction performance and the cornering performance are both reduced. Since the inside wheel speed exceeds the outside wheel speed by the threshold value, this is detected to implement the differential motion limiting control of the center differential, whereby the excessive driving torque is shifted to the other driving shaft, thereby making it possible to improve the traction performance and the cornering performance. In addition, since the inside wheel speed is slower than that of the outside wheel in a normal turning state, the differential limiting control of the center differential is not implemented, whereby the tight corner braking phenomenon can be avoided.

DETAILED DESCRIPTION OF THE PREFERRED EMBODIMENTS

An embodiment of the present invention will be described below on the basis of the accompanying drawings.

Figure 1:
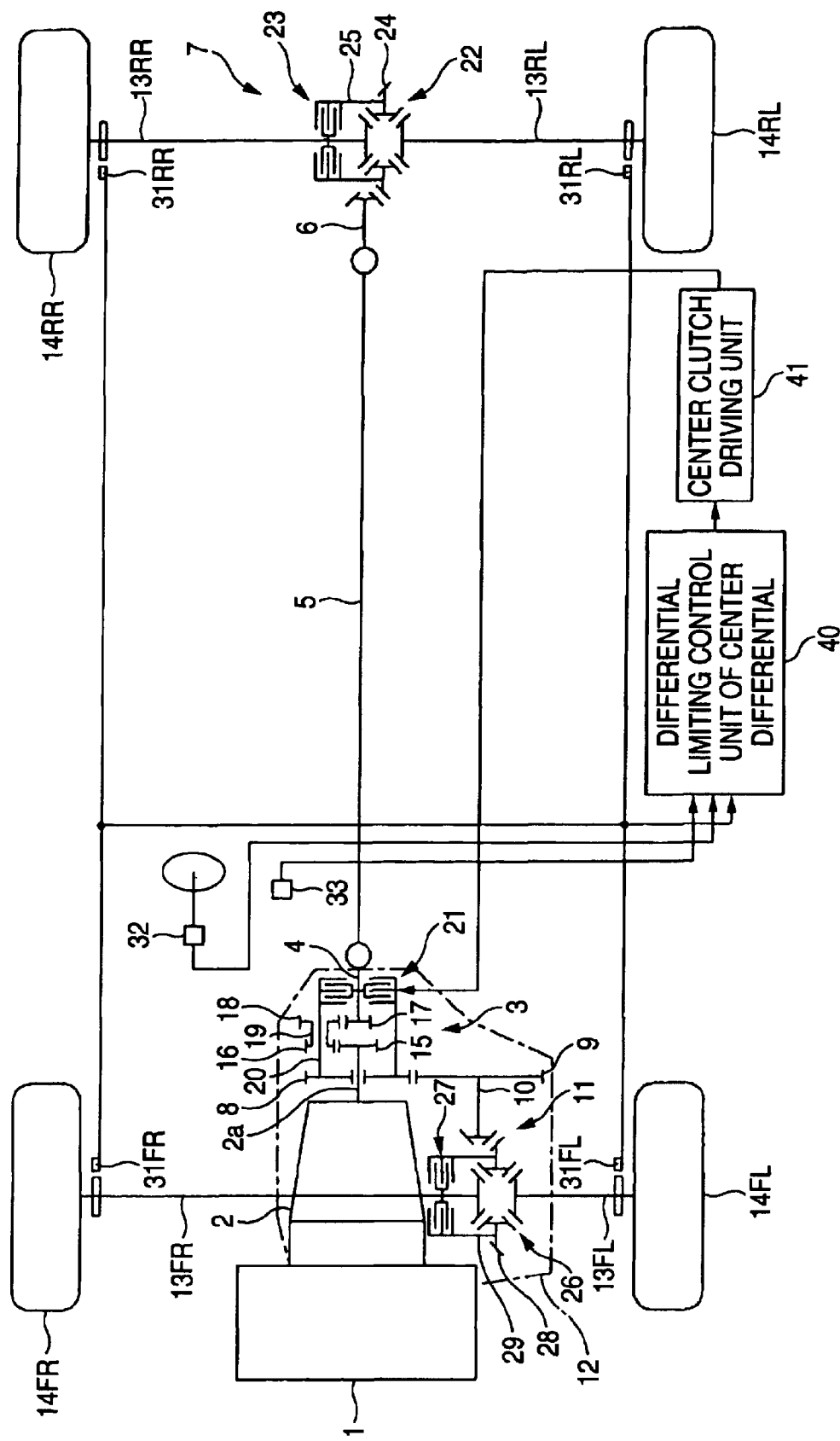
FIG. 1 is a schematic explanatory diagram of a driving force transmitting of a vehicle and a differential limiting a control unit of a center differential.
Figure 2:
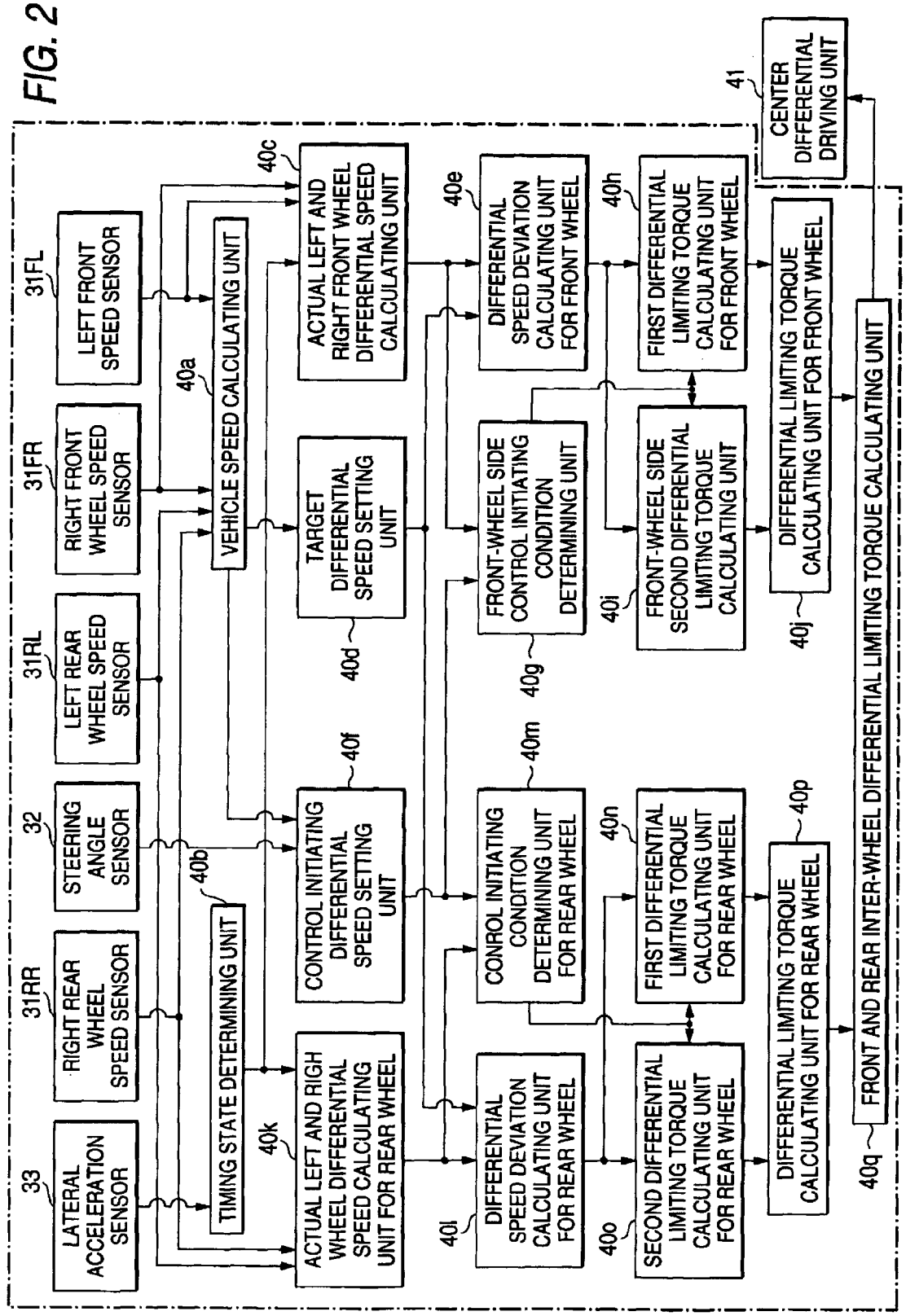
FIG. 2 is a functional block diagram of the differential limiting a control unit of the center differential.
Figure 3:
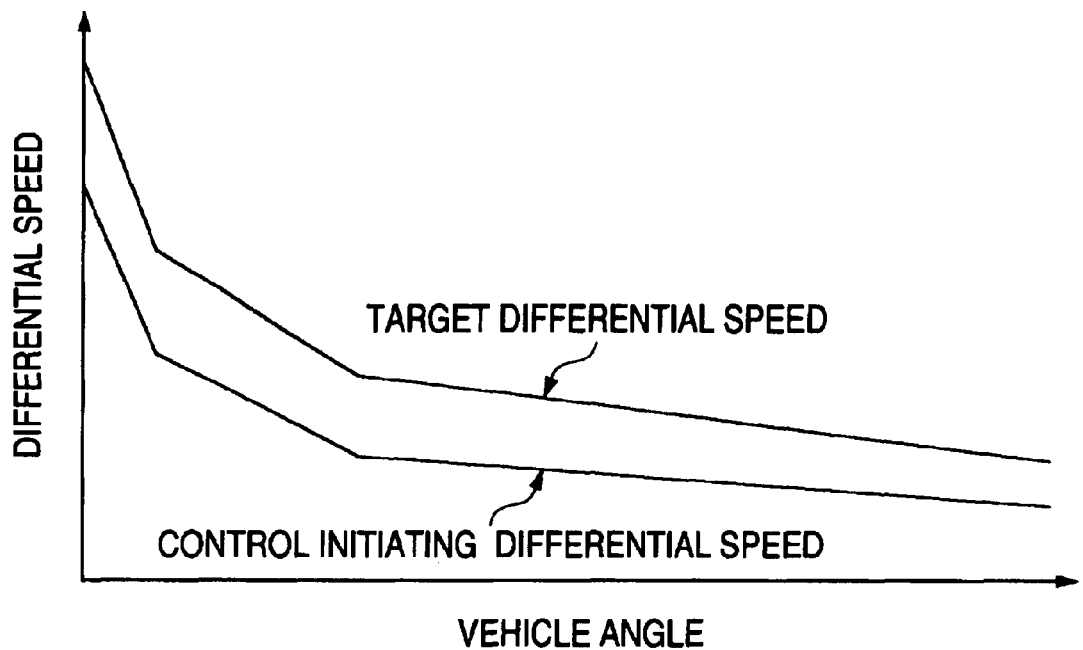
FIG. 3 is the explanatory diagram showing a relationship between a target differential speed and an actual differential speed when starting and vehicle speed.
Figure 4:
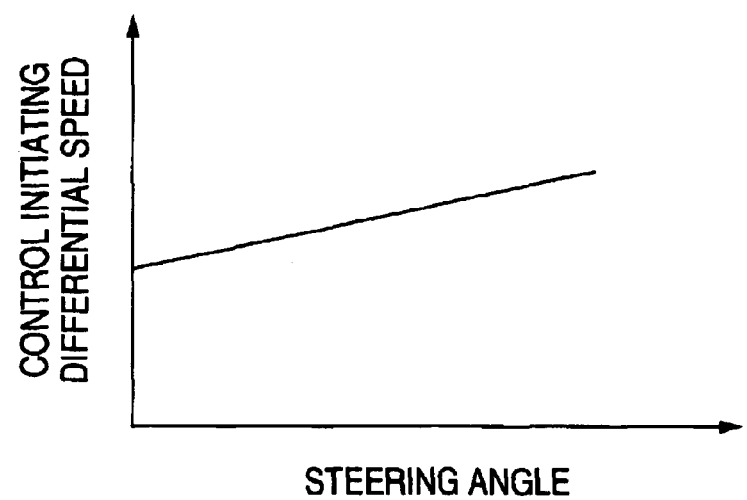
FIG. 4 is the explanatory diagram showing the relationship between the differential speed and the steering angle.
Figure 5:
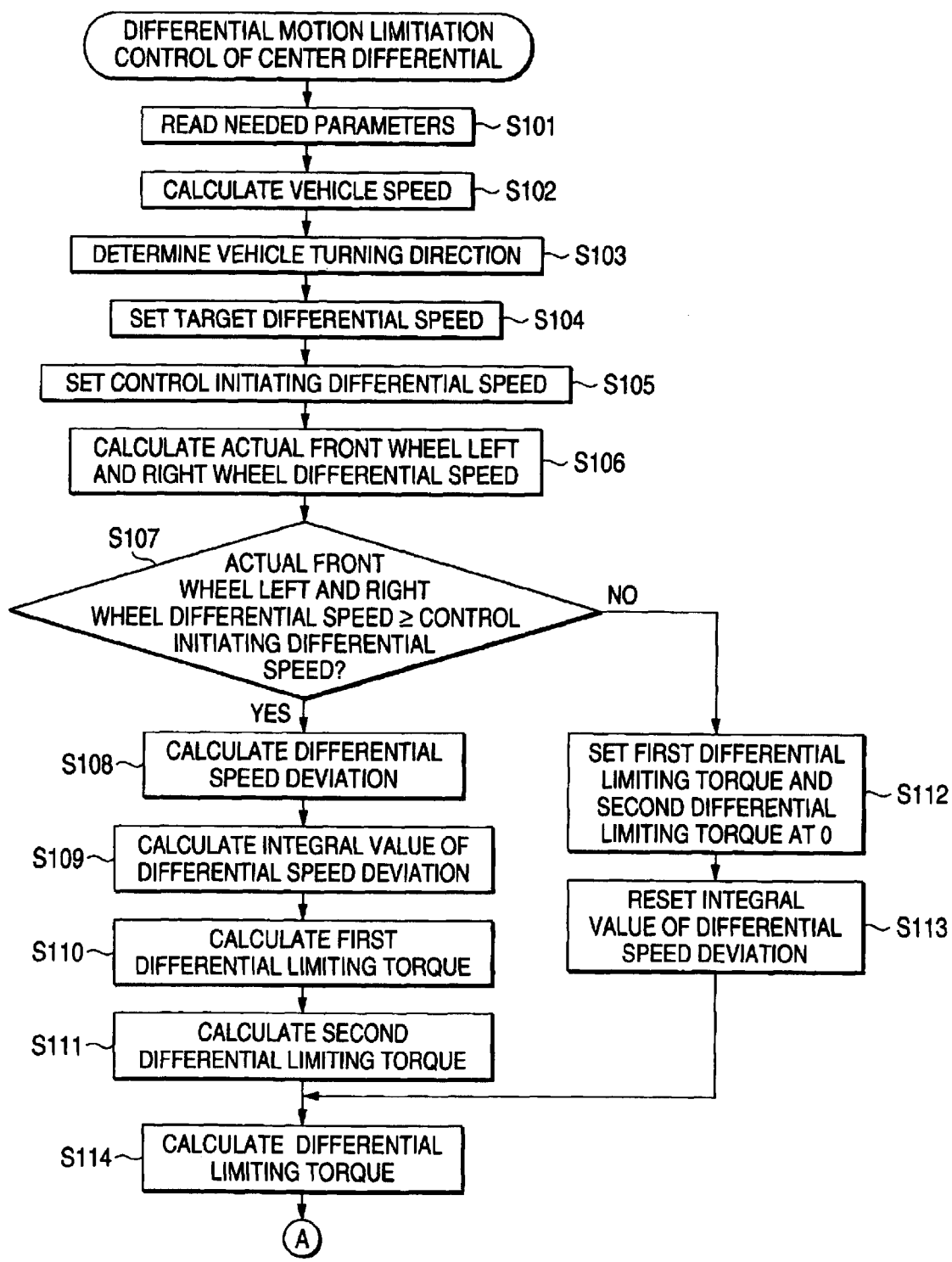
FIG. 5 is a flowchart of the differential limiting control of the center differential.
Figure 6:
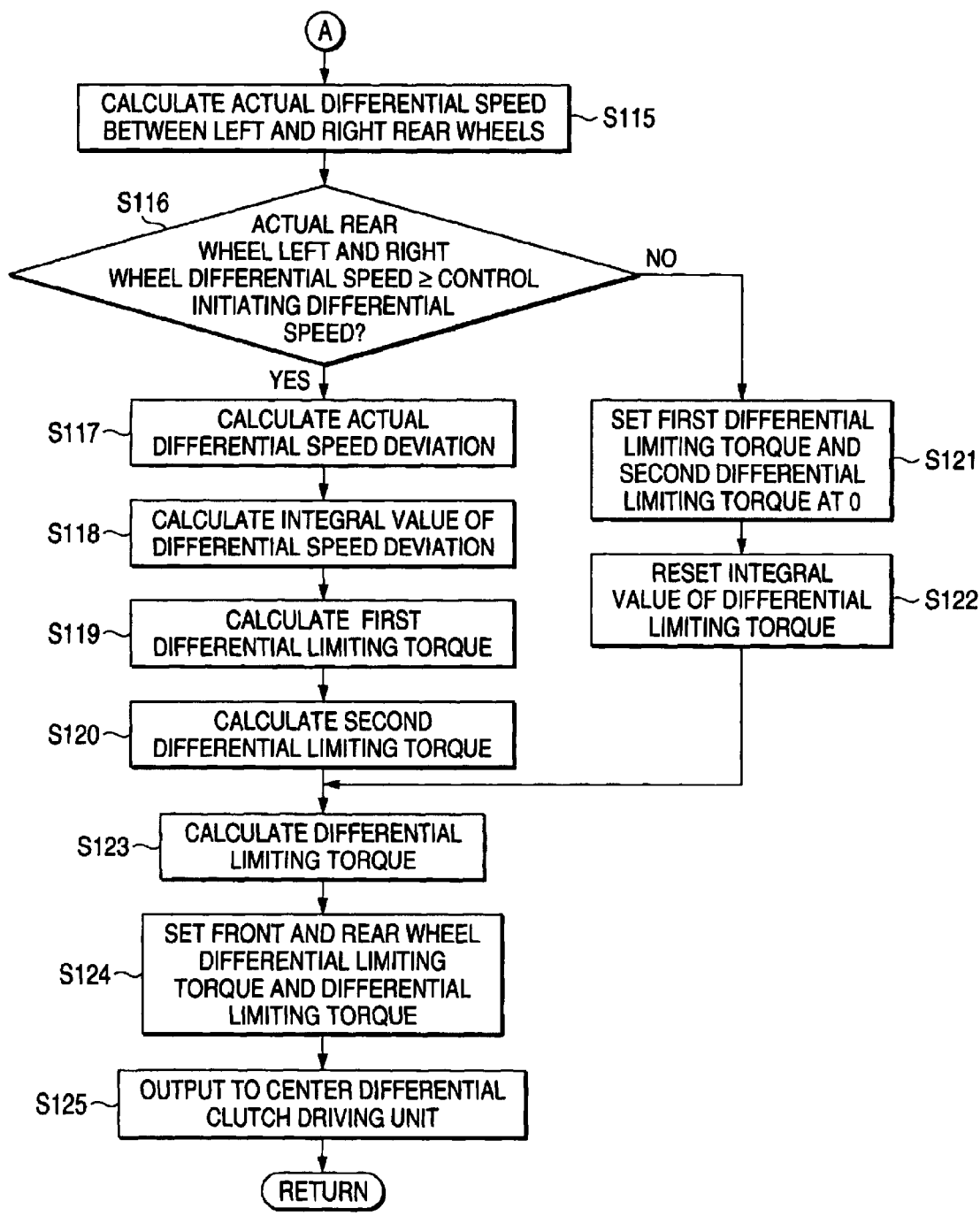
FIG. 6 is the flowchart which continues from FIG. 5.

FIGS. 1 to 6 show an embodiment of the present invention, in which FIG. 1 is a schematic explanatory diagram of a driving force transmitting of a vehicle and a differential limiting a control unit of a center differential; FIG. 2 is a functional block diagram of the differential limiting a control unit of the center differential; FIG. 3 is the explanatory diagram showing a relationship between a target differential speed and an actual differential speed when starting and vehicle speed; FIG. 4 is the explanatory diagram showing the relationship between the differential speed and the steering angle; FIG. 5 is a flowchart of the differential limiting control of the center differential; and FIG. 6 is the flowchart which continues from FIG. 5.

In FIG. 1, reference numeral 1 denotes an engine placed at a front part of a vehicle, and a driving force generated by the engine 1 is transmitted to a center differential 3 from an automatic transmission (shown as including a torque converter) behind the engine 1 by an output shaft 2a. Then, the driving force, which exits the center differential 3 toward a rear wheel side, is then inputted into a final differential 7 via a rear drive shaft 4, a propeller shaft 5 and a driving pinion 6, whereas the driving force which is directed toward a front wheel side is inputted into a front differential 11 via a transfer drive gear 8, a transfer driven gear 9, and a front drive shaft 10 which constitutes a drive pinion shaft portion. Here, the automatic transmission 2, the center differential 3 and the front final differential 11 are provided together within a case 12.

The driving force inputted into the rear final differential 7 is transmitted to a left rear wheel 14RL by a rear wheel left drive shaft 13RL, while the force is transmitted to a rear right wheel 14RR by a rear wheel right drive shaft 13RR. In addition, the driving force inputted into the front final differential 11 is transmitted to a left front wheel 14FL by a front wheel drive left shaft 13FL, while the force is transmitted to a right front wheel 14FR by a front wheel right drive shaft 13FR.

A first sun gear 15 is formed on the output shaft 2a of the center differential 3, and the first sun gear 15 meshes with a first pinion 16, whereby a first gear train is constituted.

In addition, a second sun gear 17 is formed on the rear drive shaft 4 which outputs the driving force toward the rear wheels, and the second sun gear 17 meshes with a second pinion 18, whereby a second gear train is constituted.

The first pinion 16 and the second pinion 18 are formed integrally on pinion members 19, respectively, and a plurality (for example, three) of the pinion members 19 are rotatably supported on a fixed shaft provided on a carrier 20. Then, the transfer drive gear 8 is coupled to a front end of the carrier 20 for output to the front wheels.

Additionally, the output shaft 2a is rotatably inserted into the carrier 20 from the front, whereas the rear drive shaft 4 is rotatably inserted into the carrier 20 from the rear, and the first sung gear 15 and the second sun gear 17 are installed in a middle space within the carrier 20. Then, the respective first pinions 16 and second pinions 18 on the plurality of the pinion members 19 mesh with the first sun gear 15 and the second sun gear 17, respectively.

Thus, the first and second pinions 16, 18 and the second sun gear 17 which constitute one output side and the carrier 20 of the first and second pinions 16, 18 which constitutes the other output side mesh with the first sun gear 15 which constitutes an input side, whereby a composite planetary gear having no ring gear is formed.

The composite planetary type center differential 3 provides a differential function by setting the numbers of teeth of the first and second sun gears 15, 17 and the plurality of first and second pinions 16, 18 found on a periphery of the sun gears 15, 17.

Furthermore, a basic torque distribution is made to be a desired (or an optimum) distribution (for example, an uneven torque distribution in which the driving torque is distributed heavily on the rear wheels 14L & R) by setting an appropriately meshing pitch radii of the first and second pinions 16, 18 with the first and second sun gears 15, 17, respectively.

The center differential 3 allows a thrust load to remain without being cancelled by using, for example, helical gears for the first and second sun gears 15, 17 and the first and second pinion gears 16, 18, and allowing helix angles of the first gear train and the second gear train to differ from each other. Furthermore, friction torques generated at ends of the pinion member 19 are set such that the friction torques are separated to the surface of the first and second pinions 16, 18 and a fixed shaft provided on the carrier 20 through meshing and are generated when a resultant force of tangential loads is applied. Thus, by allowing a differential limiting torque proportional to an input torque to be obtained, the center differential 3 is also allowed to provide a differential limiting function.

Moreover, a center differential clutch (a transfer clutch) 21 which adopts a hydraulic multiple disc clutch as clutch means is provided between the two output members or the carrier 20 and the rear drive shaft 4 of the center differential 3 for changing the distribution of the driving force between the front and rear wheels 14FL, FR, RL and RR. Then, a torque distribution between the front and rear wheels is allowed to be controlled to change within a range from a four wheel drive in which the front and rear axles are directly coupled with a torque distribution ratio of 50/50 to a torque distribution ratio (of, for example, 35/65 front and rear) provided by the center differential 3 by controlling the engagement force of the transfer clutch 21.

The transfer clutch 21 is connected to a center differential clutch driving unit 41 including a hydraulic circuit incorporating therein a plurality of solenoid valves, whereby the transfer clutch 21 is disengaged and engaged by a hydraulic pressure generated by the center differential clutch driving unit 41. Then, control signals (output signals directed to the respective solenoid valves) for driving the center differential clutch driving unit 41 are outputted from a differential limiting control unit 40 of a center differential, which will be described later on.

On the other hand, the rear final differential 7 includes a bevel gear type differential mechanism unit 22 and a rear differential clutch 23 as a differential limiting unit which adopts a hydraulic multiple disc clutch for limiting a differential motion between the left and right wheels 14FL & 14FR, or 14RL & 14RR. The rear differential clutch 23 is provided between a differential case 25 to which a ring gear 24 with which a drive pinion 6 meshes is fixed and a rear wheel right drive shaft 13RR.

In addition, being substantially in a similar manner to that of the rear final differential 7, the front final differential 11 includes a bevel gear type of a differential mechanism unit 26 and a front differential clutch 27 as a differential limiting unit which adopts a hydraulic multiple disc clutch for limiting the differential control between the left and right wheels. The front differential clutch 27 is provided between a differential case 29 to which a ring gear 28 with which a drive pinion of the front drive shaft 10 meshes is fixed and a front wheel right drive shaft 13FR.

Parameters required for the control are inputted into the differential limiting control unit 40 of the center differential from respective sensors, as will be described later on.

Namely, wheel speeds of the respective wheels 14FL, 14FR, 14RL, 14RR are detected by wheel speed sensors 31FL, 31FR, 31RL, 31RR, respectively, and are then inputted into the differential limiting control unit 40 of the center differential. In addition, a steering wheel angle sensor 32 for detecting a steering wheel angle and a lateral acceleration sensor 33 for detecting a lateral acceleration applied to the vehicle are provided on the vehicle, and a steering angle and a lateral acceleration which are detected by the sensors 32, 33 are inputted into the differential limiting control unit 40 of the center differential.

The differential limiting control unit 40 of the center differential includes a micro computer and circuits, and, as shown in FIG. 2, mainly includes a vehicle speed calculating unit 40a, the turning condition determining unit 40b, an actual front left and right wheel differential speed calculating unit 40c, a target differential speed setting unit 40d, a differential speed deviation calculating unit 40e, a control initiating differential speed setting unit 40f, a control initiating condition determining unit 40g, a first differential limiting torque calculating unit 40h, a second differential limiting torque calculating unit 40i, a differential limiting torque calculating unit 40j, an actual left and right wheel differential speed calculating unit 40k, a rear wheel differential speed deviation calculating unit 40l, a control initiating condition determining unit 40m, a first rear wheel differential limiting torque calculating unit 40n, a second rear wheel differential limiting torque calculating unit 40o, a rear-wheel differential limiting torque calculating unit 40p, and a front and rear wheel differential limiting toque calculating unit 40q.

Wheel speeds ωfl, ωfr, ωrl, ωrr of the respective wheels 14FL, 14FR, 14RL, 14RR are inputted into the vehicle speed calculating unit 40a from the wheel speed sensors or the respective wheel speed sensors 31FL, 31FR, 31RL, 31RR. The vehicle speed calculating unit 40a calculates a vehicle speed V by calculating, for example, an average value of the wheel speeds so inputted and output the vehicle speed so calculated to the target differential speed setting unit 40d and the control initiating differential speed setting unit 40f.

A lateral acceleration signal is inputted into the turning state determining unit 40b from the lateral acceleration sensor 33, and when an absolute value of the lateral acceleration is smaller than a predetermined value which has been set in advance. The vehicle is determined as being in substantially the straight running state, whereas when the absolute value is any other value than the predetermined value, for example, when the lateral acceleration is a positive value, the vehicle is determined as being in a left turning state. When the lateral acceleration is a negative value, the vehicle is determined as being in a right turning state. Namely, the turning state determining unit 40b is provided as the turning condition determining unit, and the turning condition of the vehicle so determined is then outputted to the actual front wheel differential speed calculating unit 40c and the actual rear wheel differential speed calculating unit 40k. Note that the turning state of the vehicle can be determined through other parameters such as a yaw rate and a steering angle, and the turning state of the vehicle may be determined thereby.

Wheel speeds ωfl, ωfr of the left and right front wheels 14FL, 14FR and the turning condition of the vehicle are inputted into the actual left and right wheel differential speed calculating unit 40c from the wheel speed sensors 31FL, 31FR of the left and right front wheels and the turning state determining unit 40b, respectively. The actual left and right wheel differential speed calculating unit 40c then calculates an actual differential speed ΔωFt between the left front wheel 14FL and the right front wheel 14FR according to the turning condition of the vehicle by using any of the following equations (1), (2), and (3).

When turning right ... $\Delta\omega Ft = \omega fr - \omega fl$ (1)

When turning left ... $\Delta\omega Ft = \omega fl - \omega fr$ (2)

When running substantially straight ... $\Delta\omega Ft = |\omega fr - \omega fl|$ (3)

Note that the actual differential speeds ΔωFt obtained by equations (3) and (4) become negative values, since the wheel speed of the outside wheel becomes faster than the wheel speed of the inside wheel in a state in which there is occurring no slippage on both the left and right front wheels.

Namely, the actual left and right wheel differential speed calculating unit 40c is provided as the actual left and right wheel differential speed calculating unit for the front wheel, and an actual differential speed ΔωFt calculated by the actual left and right wheel differential speed calculating unit 40c is then outputted to the differential speed calculating unit 40e and the control initiating condition determining unit 40g.

A vehicle speed V is inputted into the target differential speed setting unit 40d from the vehicle speed calculating unit 40a. The target differential speed setting unit 40d calculates, for example, a target differential speed Δωt according to the vehicle speed V by referring to a map of the vehicle speed and the target differential speed which have been obtained in advance from experiments and calculations.

This map of the vehicle speed and the target differential speed Δωt is set as shown in, for example, FIG. 3. The target differential speed is set in advance on the basis of the specifications of the vehicle so as to decrease gradually as the vehicle speed V increases while referring to various kinds of errors generated during actual runnings.

A target differential speed Δωt set at the target differential speed setting unit 40d is outputted to the differential speed deviation calculating unit 40e and the differential speed deviation calculating unit 40l. Namely, the target differential speed setting unit 40d is provided as a target differential speed setting unit for the front wheel side and the rear wheel side. In addition, while the same target differential speed Δωt is described as being used both on the front wheel side and the rear wheel side in this embodiment, different values may be set for the front wheel side and the rear wheel side, respectively, depending on the specifications of the vehicle. In this case, a target differential speed corresponding to the front wheel side is outputted to the differential speed deviation calculating unit 40e, and a target differential speed corresponding to the rear wheel side is outputted to the differential speed deviation calculating unit 40l.

An actual differential speed ΔωFt between the left front wheel 14FL and the right front wheel 14FR according to the turning condition and the target differential speed Δωt are inputted into the differential speed deviation calculating unit 40e from the left and right wheel differential speed calculating unit 40c and the target differential speed setting unit 40d, respectively. The differential speed deviation calculating unit 40e then calculates a deviation (differential speed deviation) εFt between the actual and target differential speeds from the following equation (4) and outputs a deviation so calculated to the first differential limiting torque calculating unit 40h and the second differential limiting torque calculating unit 40i.

$$\varepsilon Ft = \Delta\omega Ft - \Delta\omega t \quad (4)$$

A vehicle speed V is inputted into the control initiating differential speed setting unit 40f from the vehicle speed calculating unit 40a. The control initiating differential speed setting unit 40f then calculates a control initiating differential speed Δωs according to the vehicle speed from the map of the vehicle speed and control the initiating differential speed Δωs which have been obtained in advance from the experiments and calculations or a set value.

This control initiating differential speed Δωs is a smaller value than the target differential speed Δωt and is, as will be described later on, a threshold value which determines a permissible tolerance of difference in speed between the inside wheel and the outside wheel before the center differential implements a differential limiting control even when the wheel speed of the inside wheel becomes larger than that of the outside wheel. When the control initiating differential speed Δωs is set at, for example, 0, in the event that the wheel speed of the inside wheel becomes larger than the wheel speed of the outside wheel, the center differential starts a differential limiting control without any delay. Then, when the control initiating differential speed Δωs is not set at 0, the map of the vehicle speed and control initiating differential speed Δωs is set such as shown in, for example, FIG. 3. The control initiating differential speed Δωs is set in advance on the basis of the specification of a vehicle so as to decrease gradually as the vehicle speed V increases in consideration of various kinds of errors occurring during the actual runnings.

In addition, in this embodiment, a steering wheel angle is inputted into the control initiating differential speed setting unit 40f from the steering wheel angle sensor 32, so that a set control initiating differential speed Δωs can be corrected further by the steering angle for an accurate setting. This correction by the steering angle is performed by a characteristics map, for example, as shown in FIG. 4, and the larger the steering angle becomes, the more larger the control initiating differential speed Δωs is corrected.

Thus, the control initiating differential speed Δωs so set at the control initiating differential speed setting unit 40f is then outputted to the control initiating condition determining unit 40g and the control initiating condition determining unit 40m. While the same control initiating differential speed Δωs is described as being used both on the front wheel side and the rear wheel side in this embodiment, it may be possible to set different values individually on the front wheel side and the rear wheel side. As this occurs, a control initiating differential speed corresponding to the front wheel side are outputted to the control initiating condition determining unit 40g and a control initiating differential speed corresponding to the rear wheel side is outputted to the control initiating condition determining unit 40m.

An actual differential speed ΔωFt between the left front wheel 14FL and the right front wheel 14FR according to the turning condition and the control initiating differential speed Δωs are inputted into the control initiating condition determining unit 40g from the left and right wheel differential speed calculating unit 40c and the control initiating differential speed setting unit 40f, respectively. The control initiating condition determining unit 40g then compare the inputs to determine whether or not the condition is established to implement the differential limiting control of the center differential.

Namely, the control initiating condition determining unit 40g determines whether or not the actual differential speed ΔωFt between those of the left front wheel 14FL and the right front wheel 14FR according to the turning condition is smaller than that of the control initiating differential speed Δωs. Then, in the event that the actual differential speed ΔωFt is smaller than the control initiating differential speed Δωs, the front wheel control initiating condition determining unit 40g determines that the speed of the inside wheel does not exceed the speed of the outside wheel more than that of the permissible extent and that a sufficient control is implemented by the front differential clutch 27. Then the control initiating condition determining unit 40g determines that the condition has not been established to implement the differential limiting control of the center differential so as to prevent an unnecessary involvement of the differential limiting control of the center differential.

On the contrary, in the event that the actual differential speed ΔωFt is equal to or larger than the control initiating differential speed Δωs, the control initiating condition determining unit 40g determines that the speed of the inside wheel exceeds the speed of the outside wheel more than that of the permissible extent and that a sufficient control is not being implemented by the front differential clutch 27 due to a shortage of the differential limiting torque between the left and right wheels. The control initiating condition determining unit 40g then causes the center differential to implement the differential limiting control so as to shift an excessive driving force to the other driving shaft and determines that the condition to implement the differential limiting control of the center differential has been established so as to improve both the traction performance and the cornering performance.

Thus, the results of the determination carried out by the control initiating condition determining unit 40g are then outputted to the first differential limiting torque calculating unit 40h and the second differential limiting torque calculating unit 40i.

A differential speed deviation εFt and a result of the determination of the condition to implement the differential limiting control of the center differential are inputted into the first differential limiting torque calculating unit 40h from the differential speed deviation calculating unit 40e and the control initiating condition determining unit 40g, respectively. The first differential limiting torque calculating unit 40h then calculates, for example, a first differential limiting torque TsmcFt as shown below.

$$SFt = \varepsilon Ft + kiFt \cdot \int (\varepsilon Ft) dt \quad (5)$$

(however, the integration range is from 0 to t) where, kiFt is an integral term gain.

$$x = kwFt \cdot jwFt \cdot (d\epsilon Ft/dt) + TsgFt \cdot (sFt/(|sFt| + \delta Ft)) \quad (6)$$

where, kwFt is a differential term gain, jwFt an inertial term, TsgFt a switching gain, δFt a constant which makes the differential limiting force continuous in order to prevent chattering.

Then, in the event of x>0, the first differential limiting torque is given as TsmcFt=x, and in the event of x≦0, assume that the first differential limiting torque is given as TsmcFt=0. Then, referring to the results of the determination of a condition to implement the differential limiting control of the center differential sent from the control initiating condition determining unit 40g, in the event that the control initiating condition is not established when ΔωFt<Δωs, even if TsmcFt=x, TsmcFt=0 is given and resetting is implemented to give ∫(εFt)dt=0 (where, the integral range is from 0 to t).

Namely, as has been described above, in the event that the actual differential speed ΔωFt between the left front wheel 14FL and the right front wheel 14FR according to the turning conditions smaller than that of the control initiating differential speed Δωs, it is determined that the speed of the inside wheel does not exceed the speed of the outside wheel more than that of the permissible extent and that the sufficient control is implemented by the front differential clutch 27. The differential limiting torque is given as TsmcFt=0 in order to prevent unnecessary involvement of the differential limiting control of the center differential. Then, as this occurs, by resetting the integral term ∫(εFt)dt (where, the integral range is from 0 to t), the integral term is prevented from becoming an extraordinarily low value. Thus, the first differential limiting torque TsmcFt so calculated is then outputted to the differential limiting torque calculating unit 40j.

A differential speed deviation εFt and the result of the determination of the condition to implement the differential limiting control of the center differential are inputted into the second differential limiting torque calculating unit 40i from the differential speed deviation calculating unit 40e and the control initiating condition determining unit 40g, respectively. The second differential limiting torque calculating unit 40i then calculates, for example, a second differential limiting torque TpcFt as below.

Namely, in the event that the differential speed deviation εFt is larger than 0, the second differential limiting torque TpcFt is given as TpcFt=kpFt·εFt, whereas in the event that the differential speed deviation εFt is equal to or smaller than 0, the second differential limiting torque TpcFt is given as TpcFt=0, where kpFt is a proportional term gain. Then, referring to the results of the determination of the condition to implement the differential limiting control of the center differential sent from the control initiating condition determining unit 40g, in the event that the control initiating condition is not established when ΔωFt<Δωs, even if TpcFt=kpFt·εFt, TpcFt=0 is given, whereby the implementation of the differential limiting control of the center differential is avoided. The second differential limiting torque TpcFt so calculated is then outputted to the differential limiting torque calculating unit 40j.

A first differential limiting torque TsmcFt and the second differential limiting torque TpcFt are inputted into the differential limiting torque calculating unit 40j from the first differential limiting torque calculating unit 40h and the second differential limiting torque calculating unit 40i, respectively, and the differential limiting torque calculating unit 40j then calculates a differential limiting torque TlsdFt from the following equation (7) and outputs a differential limiting torque TlsdFt so calculated to the front and rear wheel differential limiting torque calculating unit 40q.

$$TlsdFt = TsmcFt + TpcFt \quad (7)$$

Thus, in this embodiment, the differential limiting torque TlsdFt can be set based on the information at the front differential clutch 27, and the differential limiting torque calculating unit for the front differential clutch 27 is made up of the differential speed deviation calculating unit 40e, the control initiating differential speed setting unit 40f, the control initiating condition determining unit 40g, the first differential limiting torque calculating unit 40h, the second differential limiting torque calculating unit 40i, and the differential limiting torque calculating unit 40j.

On the other hand, ωrl, ωrr of the left and right rear wheels 14RL, 14RR and the turning condition of the vehicle are inputted into the actual left and right wheel differential speed calculating unit 40k from the wheel speed sensors 31RL, 31RR of the left and right rear wheels and the turning state determining unit 40b, respectively. The actual left and right wheel differential speed calculating unit 40k then calculates an actual differential speed ΔωRr between the left rear wheel 14RL and the right rear wheel 14RR according to the turning state of the vehicle using any of the following equations (8), (9), and (10).

When turning right . . . ΔωRr=ωrr−ωrl     (8)

When turning left . . . ΔωRr=ωrl−ωrr     (9)

When running substantially straight . . . ΔωRr=|ωrr−ωrl|     (10)

Note that actual differential speeds ΔωRr obtained by equations (8) and (9) become negative values, since the wheel speed of the outside wheel becomes faster than the wheel speed of the inside wheel in the state in which both the left and right rear wheels do not slip,.

Namely, the actual left and right wheel differential speed calculating unit 40k is provided as an actual left and right wheel differential speed calculating unit corresponding to the rear wheel side, and an actual differential speed ΔωRr calculated at the actual left and right wheel differential speed calculating unit 40k is then outputted to the differential speed deviation calculating unit 40l and the control initiating condition determining unit 40m.

An actual differential speed ΔωRr between the left rear wheel 14RL and the right rear wheel 14RR according to the turning condition and a target differential speed Δωt are inputted into the differential speed deviation calculating unit 40l from the left and right wheel differential speed calculating unit 40k and the target differential speed setting unit 40d, respectively. The differential speed deviation calculating unit 40l calculates a deviation (differential speed deviation) εRr between the inputs from the following equation (11) and then outputs the deviation so calculated to the first differential limiting torque calculating unit 40n and the second differential limiting torque calculating unit 40o.

$$\epsilon Rr = \Delta\omega Rr - \Delta\omega t \quad (11)$$

An actual differential speed ΔωRr between the left rear wheel 14RL and the right rear wheel 14RR according to the turning condition and a control initiating differential speed Δωs are inputted into the control initiating condition determining unit 40m from the left and right wheel differential speed calculating unit 40k and the control initiating differential speed setting unit 40f, respectively. The control initiating condition determining unit 40m then makes the comparison between the inputs and determines whether or not the condition is established to implement the differential limiting control of the center differential.

Namely, the control initiating condition determining unit 40m determines whether or not the actual differential speed ΔωRr between the left rear wheel 14RL and the right rear wheel 14RR according to the turning state is smaller than the control initiating differential speed Δωs. Then, in the event that the actual differential speed ΔωRr is smaller than the control initiating differential speed Δωs, the control initiating condition determining unit 40m determines that the speed of the inside wheel does not exceed the speed of the outside wheel more than that of the permissible extent and hence that the sufficient control is implemented by the rear differential clutch 23. Then the control initiating condition determining unit 40m determines that the condition has not been established to implement the differential limiting control of the center differential in order to prevent the unnecessary involvement of the differential limiting control of the center differential.

On the contrary, in the event that the actual differential speed ΔωRr is equal to or larger than the control initiating differential speed Δωs, the control initiating condition determining unit 40m determines that the speed of the inside wheel exceeds the speed of the outside wheel more than that of the permissible extent and hence that the differential limiting torque between the left and right wheels 4LL & 4LR is so insufficient that the sufficient control is not implemented by the rear differential clutch 23. Then, the control initiating condition determining unit 40m causes the center differential to implement the differential limiting control so as to shift the exceeding driving torque to the other driving shaft and determines that the condition to implement the differential limiting control of the center differential has been established in order to improve the traction performance and the cornering performance.

Thus, the results of the determination carried out at the control initiating condition determining unit 40m are then outputted to the first differential limiting torque calculating unit 40n and the second differential limiting torque calculating unit 40o.

A differential speed deviation εRr and a result of a determination of a condition to implement the differential limiting control of the center differential are inputted to the first differential limiting torque calculating unit 40n from the differential speed deviation calculating unit 40l and the control initiating condition determining unit 40m, respectively. The first differential limiting torque calculating unit 40n calculates, for example, a first differential limiting torque TsmcRr as below.

$$SRr = \epsilon Rr + kiRr \cdot \int (\epsilon Rr) dt \quad (12)$$

(however, the integration range is from 0 to t) where, kiRr is the integral term gain.

$$x = kwRr \cdot jwRr \cdot (d\epsilon Rr/dt) + TsgRr \cdot (sRr/(|sRr| + \delta Rr) \quad (13)$$

where, kwRr is the differential term gain, jwRr the inertial term, TsgRr the switching gain, δRr the constant which makes the differential limiting force continuous in order to prevent the chattering.

Then, in the event of x>0, the first differential limiting torque is given as TsmcRr=x, and in the event of x≦0, the first differential limiting torque TsmcRr is given as TsmcRr=0 is given. Then, referring to the results of the determination of the condition to implement the differential limiting control of the center differential sent from the control initiating condition determining unit 40m, in the event that the control initiating condition is not established when ΔωRr<Δωs, even if TsmcRr=x, TsmcRr=0 is given and the resetting is implemented to give ∫(εRr)dt=0 (where, the integral range is from 0 to t).

Namely, as has been described above, in the event that the actual differential speed ΔωRr between the left rear wheel 14RL and the right rear wheel 14RR according to the turning condition is smaller than the control initiating differential speed Δωs, it is determined that the speed of the inside wheel does not exceed the speed of the outside wheel more than that of the permissible extent and that the sufficient control is implemented by the rear differential clutch 23. The differential limiting torque TsmcRr is given as TsmcRr=0 in order to prevent the unnecessary involvement of the differential limiting control of the center differential. Then, as this occurs, by resetting the integral term ∫(εRr)dt (where, the integral range is from 0 to t), the integral term is prevented from becoming the extraordinarily low value. Thus, the first differential limiting torque TsmcRr so calculated is then outputted to the differential limiting torque calculating unit 40p.

A differential speed deviation εRr and a result of the determination of the condition to implement the differential limiting control of the center differential are inputted into the second differential limiting torque calculating unit 40o from the differential speed deviation calculating unit 40l and the control initiating condition determining unit 40m, respectively. The second differential limiting torque calculating unit 40o then calculates, for example, a second differential limiting torque TpcRr as below.

Namely, in the event that the differential speed deviation εRr is larger than 0, the second differential limiting torque TpcRr is given as TpcRr=kpRr·εRr, whereas in the event that the differential speed deviation εRr is equal to or smaller than 0, the second differential limiting torque TpcRr is given as TpcRr=0, where kpRr is a proportional term gain. Then, referring to the results of the determination of the condition to implement the differential limiting control of the center differential sent from the control initiating condition determining unit 40m, in the event that the control initiating condition is not established when ΔωRr<Δωs, even if TpcRr=kpRr·εRr, TpcRr=0 is given, whereby the implementation of the differential limiting control of the center differential is avoided. The second differential limiting torque TpcRr so calculated is then outputted to the differential limiting torque calculating unit 40p.

A first differential limiting torque TsmcRr and a second differential limiting torque TpcRr are inputted into the differential limiting torque calculating unit 40p from the first differential limiting torque calculating unit 40n and the second differential limiting torque calculating unit 40o, respectively. The differential limiting torque calculating unit 40p then calculates a differential limiting torque TlsdRr by the rear wheel side from the following equation (14) and outputs a differential limiting torque TlsdRr so calculated to the front and rear wheel differential limiting torque calculating unit 40q.

$$TlsdRr = TsmcRr + TpcRr \quad (14)$$

Thus, in this embodiment, the differential limiting torque TlsdRr can be set on the basis of the information at the rear differential clutch 23, and a differential limiting torque calculating unit for the rear differential clutch 23 is made up of the differential speed deviation calculating unit 40*l*, the control initiating differential speed setting unit 40*f*, the control initiating condition determining unit 40*m*, the first differential limiting torque calculating unit 40*n*, the second differential limiting torque calculating unit 40*o*, and the differential limiting torque calculating unit 40*p*.

A differential limiting torque TlsdFt by the front wheel and a differential limiting torque TlsdRr are inputted into the front and rear wheel differential limiting torque calculating unit 40*q* from the differential limiting torque calculating unit 40*j* and the differential limiting torque calculating unit 40*p*, respectively. A larger differential limiting torque of the differential limiting torques TlsdFt, TlsdRr is determined as a differential limiting torque between the front and rear wheels and is then outputted to the center differential clutch driving unit 41. In other words, the front and rear wheel differential limiting torque calculating unit 40*q* is provided as a front and rear wheel differential limiting torque setting unit.

Next, the flow of a process at the differential limiting control unit 40 of the center differential will be described by reference to flowcharts shown in FIGS. 5 and 6.

First, in step (hereinafter, simply referred to as "S") 101, needed parameters such as the wheel speeds ωfl, ωfr, ωrl, ωrr of the respective wheels 14FL, 14FR, 14RL, 14RR, the steering angle, and the lateral acceleration are read.

Next, advance to S102, where the vehicle speed V is calculated at the vehicle speed calculating unit 40*a*, advance to S103, where a turning direction of the vehicle is determined on the basis of the lateral acceleration at the turning state determining unit 40*b*, and advance to S104, where a target differential speed Δωt according to the vehicle speed V is set at the target differential speed setting unit 40*d* by referring to the map of the vehicle speed V and the target differential speed Δωt.

Next, advance to S105, the control initiating differential speed Δωs is set at the control initiating differential speed setting unit 40*f* by referring to the map of the vehicle speed V and the control initiating differential speed Δωs and by correcting the steering wheel angle.

Next, move to S106, and an actual differential speed ΔωFt between the left front wheel 14FL and the right front wheel 14FR according to the turning condition of the vehicle is calculated by using any of the aforesaid equations (1), (2), (3) at the actual left and right wheel differential speed calculating unit 40*c*.

Thereafter, when moving to S107, the actual differential speed ΔωFt between the left front wheel 14FL and the right front wheel 14FR according to the turning condition of the vehicle is compared with the control initiating differential speed Δωs at the control initiating condition determining unit 40*g*. In the event that the front wheel differential speed ΔωFt is equal to or larger than the control initiating differential speed Δωs, it is determined that there is occurring the shortage of the differential limiting torque between the left and right wheels and that the sufficient control is not being implemented by the front differential clutch 27. A condition to implement the differential limiting control of the center differential is determined to have been established, and then advance to S108.

Thus, when advancing to S108, the differential speed deviation εFt is calculated by using the equation (4) at the differential speed deviation calculating unit 40*e*, and advance to S109.

In S109, an integral value of the differential speed deviation εFt or ∫(εFt)dt (where, the integral range is from 0 to t) is calculated at the first differential limiting torque calculating unit 40*h*, and then advance to S110, where the first differential limiting torque TsmcFt is calculated at the front wheel first differential limiting toque calculating unit 40*h*. The differential limiting torque TsmcFt depends on the value of x that is calculated by using the equation (6), and in the event of x>0, the differential limiting torque is given as TsmcFt=x, whereas in the event of x≦0, the differential limiting torque is given as TsmcFt=0.

Next, when advancing to S111, the second differential limiting torque TpcFt is calculated at the second differential limiting torque is calculated at the second differential limiting torque calculating unit 40*i*. Specifically speaking, in the event that the differential speed deviation εFt is larger than 0, the second differential limiting torque is given as TpcFt=kpFt·εFt, whereas in the event that the differential speed deviation εFt is equal to or smaller than 0, the second differential limiting torque is given as TpcFt=0.

On the other hand, in the event that the differential speed deviation εFt is determined to be smaller than the control initiating differential speed Δωs through the determination carried out in S107, it is determined that the speed of the inside wheel does not exceed the speed of the outside wheel more than that of the permissible extent and that the sufficient control is being carried out by the front differential clutch 27. It is then determined that the condition has not been established to implement the differential limiting control of the center differential in order to prevent the unnecessary involvement of the differential limiting control of the center differential, then advancing to S112.

In S112, the differential limiting torque TsmcFt and the second differential limiting torque TpcFt are set at 0, and then advance to S113, where the integral value of the differential speed deviation εFt is reset.

Thus, after the processes up to S111 have been completed to execute the differential limiting control of the center differential or the processes up to S113 have been completed not to execute the differential limiting control of the center differential, advance to S114, where a differential limiting torque TlsdFt is calculated from the first differential limiting torque TsmcFt and the second differential limiting torque TpcFt by using the equation (7) at the differential limiting torque calculating unit 40*j*. Thus, S106 to S114 are the steps where the differential limiting torque TlsdFt is set on the basis of the information at the front differential clutch 27.

Thereafter, advance to S115, where an actual differential speed ΔωRr between the left rear wheel 14RL and the right rear wheel 14RR according to the turning state of the vehicle is calculated by using any of the aforesaid equations (8), (9), (10) at the actual left and right wheel differential speed calculating unit 40*k*.

Next, when advancing to S116, the actual differential speed ΔωRr between the left rear wheel 14RL and the right rear wheel 14RR according to the turning state of the vehicle is compared with the control initiating differential speed Δωs at the control initiating condition determining unit 40*m*. In the event that the actual differential speed ΔωRr on the rear wheel side is equal to or larger than the control initiating differential speed Δωs, it is determined that there is occurring the shortage of the differential limiting torque between the left and right wheels and that the sufficient control is not being carried out by the rear differential clutch 23. The condition to implement the differential limiting control of the center differential is determined to have been established, then advancing to S117.

Thus, when advancing to S117, the differential speed deviation εRr is calculated by using the equation (1) at the differential speed deviation calculating unit 40*l*, and then advance to S118.

In S118, an integral value of the differential speed deviation εRr or ∫(εRr)dt (where, the integral range is from 0 to t) is calculated at the first differential limiting torque calculating unit 40n, and then advance to S119, where the first differential limiting torque TsmcRr is calculated at the first differential limiting toque calculating unit 40n. The differential limiting torque TsmcRr depends on the value of x calculated by using the equation (13), and in the event of x>0, the differential limiting torque is given as TsmcRr=x, whereas in the event of x≦0, the differential limiting torque TsmcRr is given as TsmcRr=0.

Next, when advancing to S120, the second differential limiting torque TpcRr is calculated at the second differential limiting torque is calculated at the second differential limiting torque calculating unit 40o. Specifically speaking, in the event that the differential speed deviation εRr is larger than 0, the second differential limiting torque is given as TpcRr=kpRr·εRr, whereas in the event that the differential speed deviation εRr is equal to or smaller than 0, the second differential limiting torque is given as TpcRr=0.

On the other hand, in the event that the differential speed deviation εRr is determined to be smaller than the control initiating differential speed Δωs through the determination carried out in S116, it is determined that the speed of the inside wheel does not exceed the speed of the outside wheel more than that of the permissible extent and that the sufficient control is being carried out by the rear differential clutch 23. It is then determined that the condition has not been established to implement the differential limiting control of the center differential in order to prevent the unnecessary involvement of the differential limiting control of the center differential, then advancing to S121.

In S121, the differential limiting torque TsmcRr and the second differential limiting torque TpcRr are set at 0, and then advance to S122, where the integral value of the differential speed deviation eRr is reset.

Thus, after the processes up to S120 have been completed to execute the differential limiting control of the center differential or the processes up to S123 have been completed not to execute the differential limiting control of the center differential, advance to S123, where the differential limiting torque TlsdRr is calculated from the first differential limiting torque TsmcRr and the second differential limiting torque TpcRr by using the equation (14) at the differential limiting torque calculating unit 40p. Thus, S115 to S123 are steps where the differential limiting torque TlsdRr is set on the basis of the information at the rear differential clutch 23.

Thereafter, advance to S124, where the differential limiting torque TlsdFt by the front wheel and the differential limiting torque TlsdRr by the rear wheel side are compared with each other at the front and rear wheel differential torque calculating unit 40q. A larger one of the differential limiting torques TlsdFt, TlsdRr is determined as a differential limiting torque Tlsd between the front and rear wheels. Then, advance to S125, where the differential limiting torque so determined is outputted to the center differential clutch driving unit 41 and exit the program.

Thus, according to the present invention, for example, when the grip of the inside wheel has reached to the limit and the inside wheel attempts to spin during the sporty running (the accelerator pedal is depressed while turning. The driving torque is shifted to the outside wheel by the mechanical differential limiting control between the left and right wheels, whereby a yaw moment of the front the vehicle toward the turning direction is generated. As this occurs, with the sufficient differential limiting torque between the left and right wheels, the differential limiting of the center differential is not executed, and therefore there is no risk that the differential control of the center differential interferes unnecessarily. On the other hand, with an insufficient differential limiting torque between the left and right wheels, the inside wheel rotates much faster than the outside wheels, and the traction performance and the cornering performance are both reduced, but the exceeding driving torque is shifted to the other driving shaft so as to improve both the traction performance and the cornering performance by executing the differential limiting control of the center differential when the faster rotation of the inside wheel is detected. In addition, since the speed of the inside wheel is lower than that of the outside wheel in a normal turning condition, the differential limiting control of the center differential is not executed to thereby avoid a tight corner braking phenomenon.

In addition, while the embodiment has been described as being applied to the vehicle having the differential limiting mechanism both on the front and rear wheel sides, it goes without saying that the present invention can also be applied to the vehicle having the differential limiting mechanism either on the front or rear sides.

Thus, as has been described heretofore, in the four wheel drive vehicle having the differential limiting mechanism at least on either one of the front or rear wheel side, the unnecessary spin of the inside wheel can be prevented and the tight corner braking phenomenon occurring when the vehicle is steered largely at a low speed can be avoided, while exhibiting the maximum turnability of the front portion of the vehicle by the differential limiting control between the left and right wheels at the time of the sporty running.

The disclosure of Japanese Patent Application No. 2002-230432 filed on Aug. 7, 2002 including the specification, drawings and abstract is incorporated herein by reference in its entirety.

While the presently preferred embodiments of the present invention have been shown and described, it is to be understood that these disclosures are for the purpose of illustration and that various changes and modifications may be made without departing from the scope of the present invention as set forth in the appended claims.

What is claimed is:

1. A control apparatus for four wheel drive vehicle having a differential limiting unit on at least either one of a front wheel side or a rear wheel side, comprising:

a turning state determining unit for determining a turning state of said vehicle;

an actual left and right wheel differential speed calculating unit for calculating an actual left and right wheel differential speed in accordance with a turning state of the vehicle;

a target differential speed setting unit for setting a left and right wheel target differential speed;

a differential limiting torque calculating unit for setting a differential limiting torque at 0 on basis of information from the differential limiting unit when an inside wheel speed falls below an outside wheel speed by a preset threshold value in a turning state and for calculating a differential limiting torque on basis of said information about the left and right wheel target differential speed and the actual left and right wheel differential speed when said inside wheel speed exceeds said outside wheel speed by a preset threshold value in said turning state; and a front and rear wheel differential limiting torque setting unit for setting a front and rear wheel differential limiting torque calculated in the differential limiting torque calculating unit in dependency on said differential limiting torque on basis of said information.

2. The control apparatus as set forth in claim 1, wherein:
0 is the threshold value used for comparing the inside wheel speed with the outside wheel speed in the turning state.

3. The control apparatus as set forth in claim 1, wherein:
the actual left and right wheel differential speed calculating unit regards an actual left and right wheel differential speed as an absolute value of said left and right wheel differential speed after the differential limiting torque calculating unit calculates a differential limiting torque based on said information from the differential limiting unit in dependency on the left and right wheel target differential speed and the absolute value when the turning state determining unit determines said turning state substantially as said running straight condition.

4. The control apparatus as set forth in claim 2, wherein:
the actual left and right wheel differential speed calculating unit regards an actual left and right wheel differential speed as an absolute value of said left and right wheel differential speed after the differential limiting torque calculating unit calculates a differential limiting torque based on said information from the differential limiting unit in dependency on the left and right wheel target differential speed and the absolute value when the turning state determining unit determines said turning state substantially as said running straight condition.

5. The control apparatus as set forth in claim 1, wherein:
the turning state determining unit determines said turning state from at least either one of a lateral acceleration, a yaw rate or a steering angle.

6. The control apparatus as set forth in claim 2, wherein:
the turning state determining unit determines said turning condition from at least either one of said lateral acceleration, said yaw rate or said steering angle.

7. The control apparatus as set forth in claim 3, wherein:
the turning state determining unit determines said turning condition from at least either one of said lateral acceleration, said yaw rate or said steering angle.

8. The control apparatus as set forth in claim 4, wherein:
the turning state determining unit determines said turning condition from at least either one of said lateral acceleration, said yaw rate or said steering angle.

9. The control apparatus as set forth in claim 5, wherein:
the turning state determining unit determines that the vehicle is in substantially a straight running state when a first absolute value of at least either one of the lateral acceleration, the yaw rate or the steering angle is smaller than a predetermined value.

10. The control apparatus as set forth in claim 6, wherein:
the turning state determining unit determines that the vehicle is in substantially a straight running state when a first absolute value of at least either one of the lateral acceleration, the yaw rate or the steering angle is smaller than a predetermined value.

11. The control apparatus as set forth in claim 7, wherein:
the turning state determining unit determines that the vehicle is in substantially a straight running state when a first absolute value of at least either one of the lateral acceleration, the yaw rate or the steering angle is smaller than a predetermined value.

12. The control apparatus as set forth in claim 8, wherein:
the turning state determining unit determines that the vehicle is in substantially a straight running state when a first absolute value of at least either one of the lateral acceleration, the yaw rate or the steering angle is smaller than a predetermined value.

13. A control method for four wheel drive vehicle having a differential limiting unit on at least either one of a front wheel side or a rear wheel side, comprising steps of:

determining the turning state of said vehicle;

calculating an actual left and right wheel differential speed in accordance with a turning state of the vehicle;

setting a left and right wheel target differential speed;

setting a differential limiting torque at 0 on basis of information from the differential limiting unit, when an inside wheel speed falls below an outside wheel speed by a preset threshold value in a turning state;

calculating a differential limiting torque on basis of said information about the left and right wheel target differential speed and the actual left and right wheel differential speed, when said inside wheel speed exceeds said outside wheel speed by a preset threshold value in said turning state; and setting a front and rear wheel differential limiting torque calculated at the previous step in dependency on said differential limiting torque on basis of said information.

14. The control method as set forth in claim 13, wherein:
0 is the threshold value used for comparing the inside wheel speed with the outside wheel speed in the turning state.

15. The control method as set forth in claim 13, wherein:
the actual left and right wheel differential speed calculating step regards an actual left and right wheel differential speed as an absolute value of said left and right wheel differential speed after the differential limiting torque calculating step calculates a differential limiting torque based on said information from the differential limiting unit in dependency on the left and right wheel target differential speed and the absolute value when the turning state is determined said turning state substantially as a running straight condition.

16. The control method as set forth in claim 14, wherein:
the actual left and right wheel differential speed calculating step regards an actual left and right wheel differential speed as an absolute value of said left and right wheel differential speed after the differential limiting torque calculating step calculates a differential limiting torque based on said information from the differential limiting unit in dependency on the left and right wheel target differential speed and the absolute value when the turning state is determined said turning state substantially as a running straight condition.

17. The control method as set forth in claim 13, wherein:
the turning state is determined said turning state from at least either one of a lateral acceleration, a yaw rate or a steering angle.

18. The control method as set forth in claim 14, wherein:
the turning state is determined said turning state from at least either one of a lateral acceleration, a yaw rate or a steering angle.

19. The control method as set forth in claim 15, wherein:
the turning state is determined said turning state from at least either one of a lateral acceleration, a yaw rate or a steering angle.

20. The control method as set forth in claim 16, wherein:
the turning state is determined said turning state from at least either one of a lateral acceleration, a yaw rate or a steering angle.

21. The control method as set forth in claim 17, wherein:
the turning state is determined that the vehicle is in substantially a straight running state when a first absolute value of at least one of the lateral acceleration, the yaw rate or the steering angle is smaller than a predetermined value.

22. The control method as set forth in claim 18, wherein:
the turning state is determined that the vehicle is in substantially a straight running state when a first absolute value of at least one of the lateral acceleration, the yaw rate or the steering angle is smaller than a predetermined value.

23. The control method as set forth in claim 19, wherein:
the turning state is determined that the vehicle is in substantially a straight running state when a first absolute value of at least one of the lateral acceleration, the yaw rate or the steering angle is smaller than a predetermined value.

24. The control method as set forth in claim 20, wherein:
the turning state is determined that the vehicle is in substantially a straight running state when a first absolute value of at least one of the lateral acceleration, the yaw rate or the steering angle is smaller than a predetermined value.

* * * * *